United States Patent
Wang et al.

(10) Patent No.: US 12,119,171 B2
(45) Date of Patent: Oct. 15, 2024

(54) HIGH-TEMPERATURE SUPERCONDUCTING FLUX PUMP SYSTEM

(71) Applicant: SICHUAN UNIVERSITY, Chengdu (CN)

(72) Inventors: Wei Wang, Chongqing (CN); Hanxin Ye, Tongcheng (CN); Chao Yang, Xuchang (CN); Hong Li, Huanggang (CN); Jiafu Wei, Chengdu (CN); Yuntian Zhang, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 18/290,317

(22) PCT Filed: Jul. 4, 2022

(86) PCT No.: PCT/CN2022/103547
§ 371 (c)(1),
(2) Date: Nov. 13, 2023

(87) PCT Pub. No.: WO2023/284572
PCT Pub. Date: Jan. 19, 2023

(65) Prior Publication Data
US 2024/0249865 A1    Jul. 25, 2024

(30) Foreign Application Priority Data
Jul. 12, 2021 (CN) ......................... 202110783181.X

(51) Int. Cl.
*H01F 6/06* (2006.01)
*H01F 6/00* (2006.01)

(52) U.S. Cl.
CPC ............. *H01F 6/005* (2013.01); *H01F 6/008* (2013.01); *H01F 6/06* (2013.01)

(58) Field of Classification Search
CPC ............. H01F 6/005; H01F 6/008; H01F 6/06
(Continued)

(56) References Cited

U.S. PATENT DOCUMENTS 7,385,317 B2 * 6/2008 Sugita .................... H02K 41/03
310/15
9,318,937 B2 * 4/2016 Himmelmann ......... H02P 25/28
(Continued)

FOREIGN PATENT DOCUMENTS

CN      205789468 U     12/2016
CN      106843366 A      6/2017
(Continued)

*Primary Examiner* — Shawki S Ismail
*Assistant Examiner* — Lisa N Homza
(74) *Attorney, Agent, or Firm* — Bayramoglu Law Offices LLC

(57) ABSTRACT

A high-temperature superconducting flux pump system comprises a flux pump body, a superconducting load, and a stator group. A double-pancake coil group comprises at least one double-pancake coil. The stator group comprises at least one stator. The flux pump body has an air gap for receiving the stator group. The superconducting load and the stator group are connected to form a closed circuit. The high-temperature superconducting flux pump system has a simpler structure, solves the problem of low charging rate of magnets, and greatly reduces the power cost without changing the magnet structure and winding cost.

6 Claims, 9 Drawing Sheets

(58) Field of Classification Search
USPC .......................................................... 335/216
See application file for complete search history.

(56) References Cited

U.S. PATENT DOCUMENTS

| | | | |
|---|---|---|---|
| 2004/0061396 A1* | 4/2004 | Narita | H02K 17/02 310/112 |
| 2005/0253464 A1* | 11/2005 | Sugita | H02K 41/03 310/12.15 |
| 2008/0252404 A1 | 10/2008 | Coombs et al. | |
| 2009/0085511 A1 | 4/2009 | Meinke et al. | |
| 2011/0109173 A1* | 5/2011 | Sugita | H02K 33/16 310/12.18 |
| 2018/0218818 A1 | 8/2018 | Geng et al. | |
| 2022/0368201 A1* | 11/2022 | Shi | H02K 21/24 |

FOREIGN PATENT DOCUMENTS

| | | |
|---|---|---|
| CN | 107077944 A | 8/2017 |
| CN | 107294353 A | 10/2017 |
| CN | 112098911 A | 12/2020 |
| JP | 2000243619 A | 9/2000 |
| WO | 2017021674 A1 | 2/2017 |

\* cited by examiner

HIGH-TEMPERATURE SUPERCONDUCTING FLUX PUMP SYSTEM

CROSS REFERENCE TO RELATED APPLICATIONS

This application is the national phase entry of International Application No. PCT/CN2022/103547, filed on Jul. 4, 2022, which is based upon and claims priority to Chinese Patent Application No. 202110783181.X, filed on Jul. 12, 2021, the entire contents of which are incorporated herein by reference.

TECHNICAL FIELD

The invention belongs to the technical field of superconducting magnet excitation systems, and particularly relates to a high-temperature superconducting flux pump system.

BACKGROUND

Compared with traditional permanent magnets and common electromagnets, superconducting magnets, as an important part in the superconducting power application field, have a low weight, small size and extremely low loss, can generate a higher-intensity magnetic field, and are applied to the medical field, energy field and traffic field because of their superiorities.

At present, the development difficulty of superconducting magnets is that high-temperature superconducting coils cannot operate in a continuous current mode. The failure to completely eliminate the current loss caused by flux creep and welding resistance leads to nonnegligible current attenuations of high-temperature superconducting closed circuits.

Existing flux pumps can magnetize superconducting loads without establishing a contact-type current lead between a low-temperature environment and a normal-temperature environment, thus cutting off heat connection between the low-temperature environment and the non-low-temperature environment.

However, traditional flux pumps have a low charging rate, a complex structure and other defects.

SUMMARY

To solve the abovementioned technical problems, the invention discloses a high-temperature superconducting flux pump system, which has a simpler structure, a charging current of thousands of amperes, and a lower power cost on the premise of not changing the magnet structure and winding cost. The specific technical solution of the invention is as follows:

A high-temperature superconducting flux pump system comprises:

A flux pump body;
A superconducting load; and
A stator unit comprising at least one stator;
Wherein, the flux pump body has an air gap for receiving the stator unit, and the superconducting load and the stator unit are connected to form a closed circuit.

Preferably, the flux pump body comprises:
An alternating-current winding;
A direct-current winding disposed at one or two ends of the alternating-current winding; and
A first magnetic yoke;
Wherein, when the direct-current winding is disposed at one end of the alternating-current winding, the magnetic yoke has an end connected to the direct-current winding, as well as an end extending to the other end, away from the direct-current winding, of the alternating-current winding;
When the direct-current windings are disposed at the two ends of the alternating-current winding, the magnetic yoke has an end connected to the direct-current winding located at one end of the alternating-current winding, as well as an end connected to the direct-current winding at the other end of the alternating-current winding, such that a magnetic circuit is formed when a flux pump operates; and the number of the direct-current windings at one end of the alternating-current winding is the same as the number of the direct-current windings at the other end of the alternating-current winding;

The air gap for receiving the stator unit is located between the alternating-current winding and the first magnetic yoke.

Preferably, the superconducting load has an inlet terminal and an outlet terminal, and two ends of the stator unit are connected to the inlet terminal and the outlet terminal respectively to form a closed circuit.

Preferably, the high-temperature superconducting flux pump system comprises at least two superconducting loads, and each of the superconducting loads has an inlet terminal and an outlet terminal; and the inlet terminal and the outlet terminal of each of the superconducting loads are connected to the stator unit to form a closed circuit.

Preferably, the flux pump body comprises two magnetic yokes, which are located at two ends of the alternating-current winding in a length direction respectively and are connected to the direct-current windings at the two ends of the alternating-current winding respectively, such that two magnetic circuits are formed when the flux pump operates;

Wherein, the high-temperature superconducting flux pump system comprises two stator units which are located in different air gaps, and the two stator units are connected in parallel and are then connected to the superconducting load to form a closed circuit.

Preferably, the two stator units connected in parallel have two connecting terminals, and the inlet terminal and the outlet terminal are connected to the two connecting terminals respectively.

Preferably, each stator unit comprises at least two stators, and all the stators in each stator unit are arranged in parallel; the two stator units connected in parallel have an even number of connecting terminals, which is at least two; each of the connecting terminals comprises two parts, wherein one part is connected to the inlet terminal and the other part is connected to the outlet terminal.

Preferably, the superconducting load comprises N individual loads, wherein N≥2, and N is an even number;

The high-temperature superconducting flux pump system comprises two stator units, and each stator unit comprises N/2 stators;

In the superconducting load, N/2 individual loads are in one-to-one correspondence with the stators in one stator unit and are connected to the stators to form a closed circuit; and the other N/2 individual loads are in one-to-one correspondence with the stators in the other stator unit and are connected to the stators to form a closed circuit.

Preferably, the superconducting load comprise M individual loads, wherein M≥3, and M is an odd number;

The high-temperature superconducting flux pump system comprises two stator units, wherein one of the two stator units comprises (M−1)/2 stators, and the other stator unit comprises (M+1)/2 stators;

In the superconducting load, (M−1)/2 individual loads are in one-to-one correspondence with the stators in one stator unit and are connected to the stators to form a closed circuit; and the other (M+1)/2 individual loads are in one-to-one correspondence with the stators in the other stator unit and are connected to the stators to form a closed circuit.

Preferably, the flux pump body comprises two first magnetic yokes, which are located at two ends of the alternating-current winding in a length direction respectively and are connected to the direct-current windings at the two ends of the alternating-current winding respectively, such that two magnetic circuits are formed when the flux pump operates;

The high-temperature superconducting flux pump system comprises two superconducting loads which are located at the two ends of the alternating-current winding in the length direction respectively, and each of the two superconducting loads is connected to the stator unit at the same end, such that two closed circuits are formed.

Compared with the prior art, the stator unit can realize contactless excitation of the superconducting load by means of the alternating-current winding and the direct-current winding; wherein, the direct-current winding is supplied with power by a direct-current power source, and the amplitude of direct current can be regulated; the alternating-current winding is supplied with power by a three-phase variable-frequency inverter, and the amplitude and frequency of alternating current can be regulated; the system generates a direct-current biased traveling wave magnetic field through the flux pump body to enable the alternating-current winding to generate a standard sinusoidal magnetic field and the direct-current winding to generate a biased direct-current magnetic field, such that the system of the invention optimizes the charging rate with a simple structure, and effectively and obviously provides a higher charging rate with a low cost and high efficiency; in addition, the invention provides a contactless excitation system which can realize superconducting direct-current output of thousands of amperes.

Figure 1:
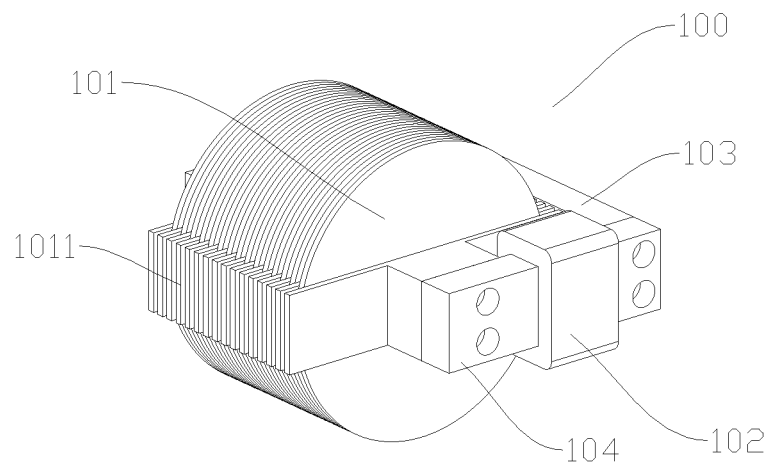
FIG. 1 is one schematic diagram of a flux pump body according to one embodiment of the invention.
Figure 2:
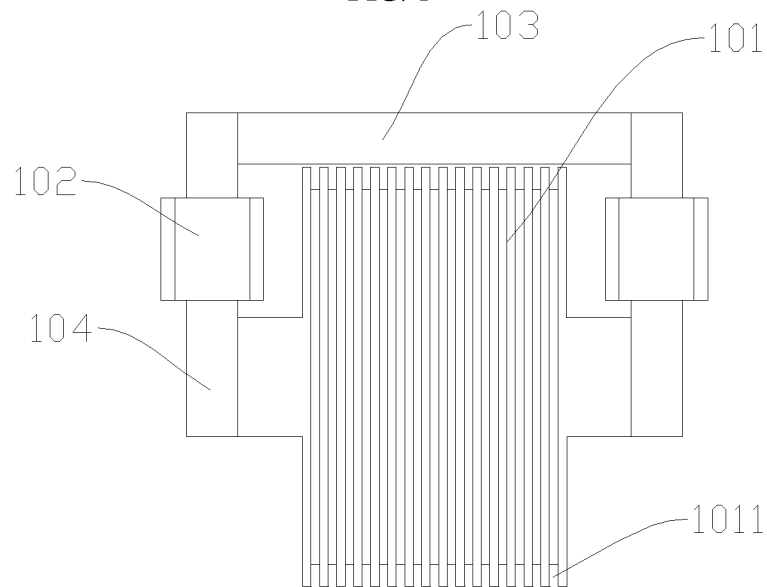
FIG. 2 is a top view of FIG. 1.
Figure 3:
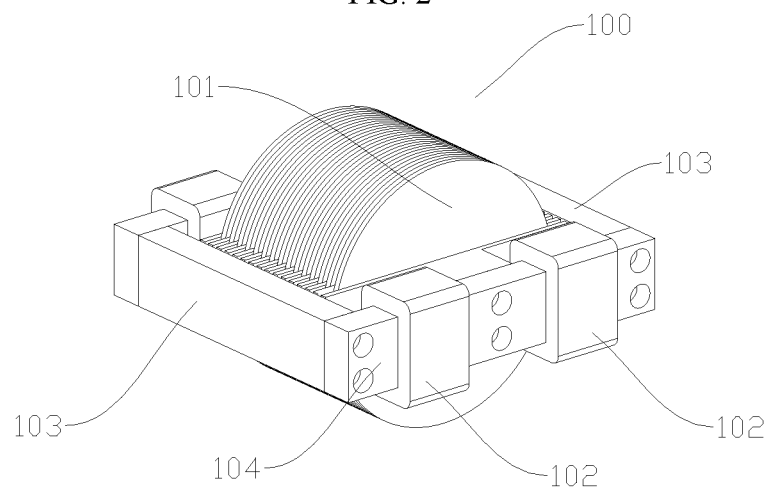
FIG. 3 is another schematic diagram of the flux pump body according to one embodiment of the invention.
Figure 4:
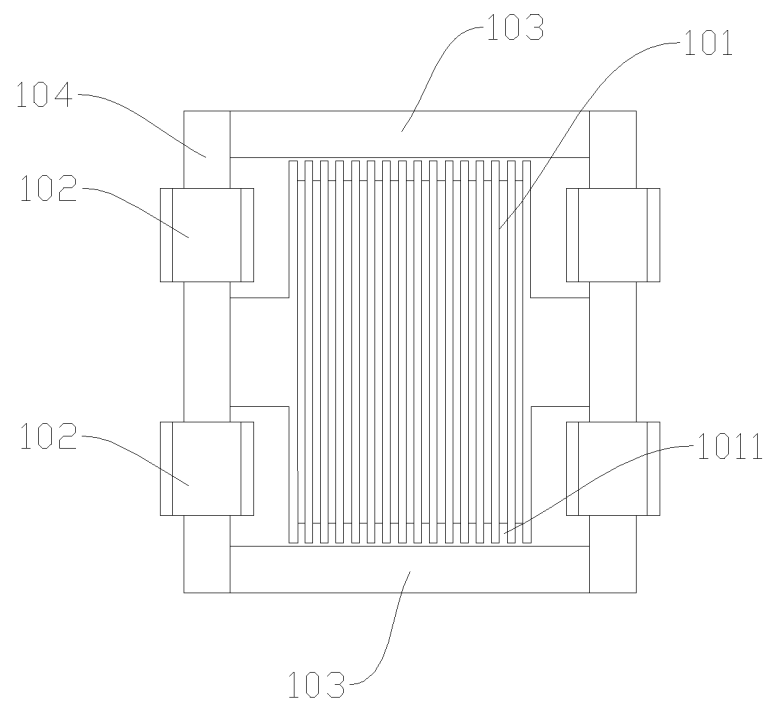
FIG. 4 is a top view of FIG. 3.
Figure 5:
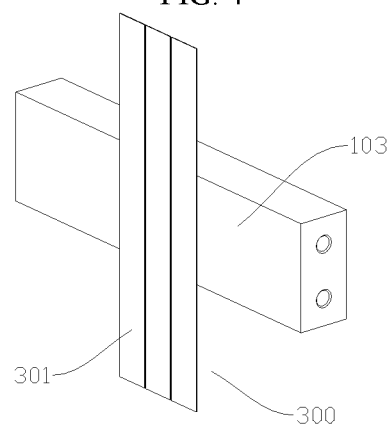
FIG. 5 is a schematic diagram of the relative positions of a stator unit and a first magnetic yoke according to one embodiment of the invention.
Figure 6:
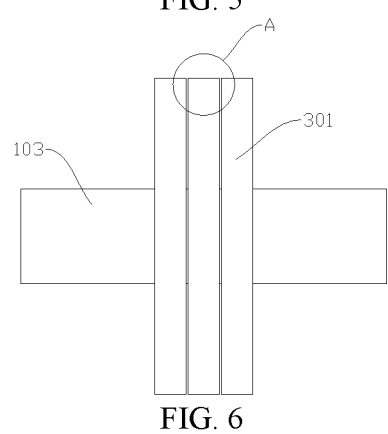
FIG. 6 is a front view of FIG. 5.
Figure 7:
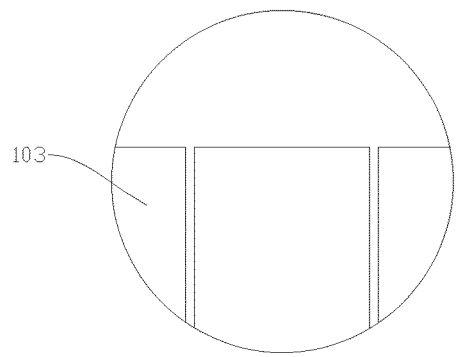
FIG. 7 is an enlarged view of part A in FIG. 6.
Figure 8:
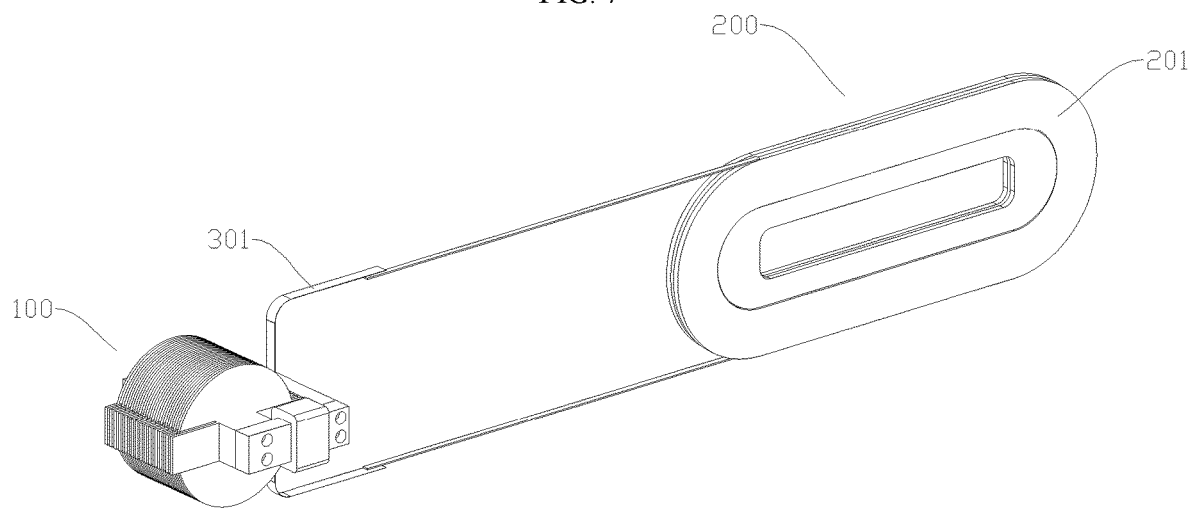
FIG. 8 is one schematic diagram of a unilateral excitation system according to one embodiment of the invention.
Figure 9:
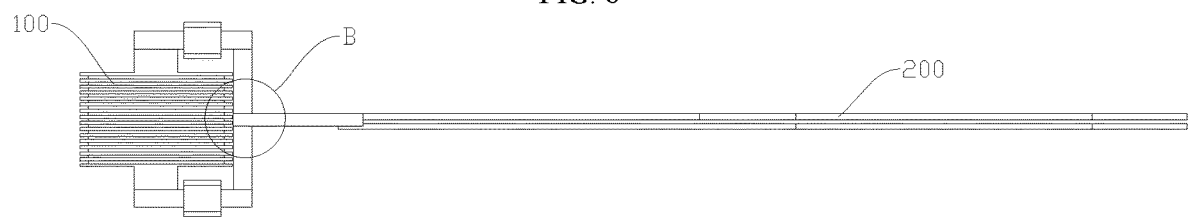
FIG. 9 is a top view of FIG. 8.
Figure 10:
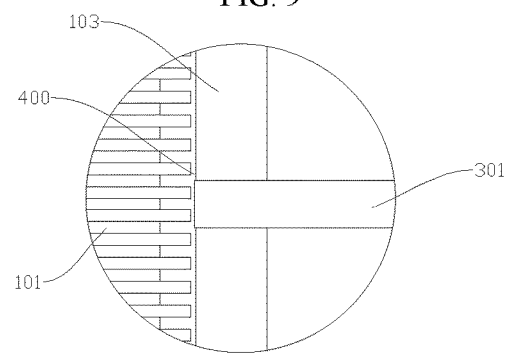
FIG. 10 is an enlarged view of part B in FIG. 9.

In the figures: 100, flux pump body; 101, alternating-current winding; 1011, socket; 102, direct-current winding; 103, first magnetic yoke; 104, second magnetic yoke; 200, superconducting load; 201, individual load; 300, stator unit; 301, stator; 400, air gap; 500, wide stator.

DETAILED DESCRIPTION OF THE EMBODIMENTS

To allow those skilled in the art to have a better understanding of the technical solution of the invention, the invention will be described in further detail below in conjunction with specific embodiments.

To gain a good understanding of the technical solution of the invention, a superconducting load 200 is used for explanation in the following embodiments. It can be understood that the superconducting load may be a superconducting cable, or the like.

As shown in FIG. 1-FIG. 10, a high-temperature superconducting flux pump system comprises a flux pump body 100, a superconducting load 200 and a stator unit 300, wherein the superconducting load 200 comprises at least one individual load 201, the stator unit 300 comprises at least stator 301, the flux pump body 100 has an air gap 400 for receiving the stator unit 300, and the superconducting load 200 and the stator unit 300 are connected to form a closed circuit.

In this embodiment, the individual load 201 and the stator 301 are provided with high-temperature superconducting strips, which are specifically ReBCO strips. The high-temperature superconducting strip is formed by a hastelloy layer, a ReBCO layer and a buffer layer which are stacked on a substrate sequentially from bottom to top, and has an operating temperature not higher than 77K, wherein Re is rare earth. Wherein, the superconducting load 200 is a double-pancake coil group, and the individual load 201 is a double-pancake coil, that is to say, the superconducting load 200 is formed by at least one individual load 201.

In this embodiment, the individual load 201 may be a traditional circular individual load 201 or a track-type individual load 201 similar to a standard 400 M track; and in addition to the double-pancake coil, the individual load 201 may be different types of single-pancake coils, which will not be detailed below.

To facilitate the use of this embodiment, the flux pump body 100 comprises an alternating-current winding 101, direct-current windings 102 and a first magnetic yoke 103, wherein the direct-current windings 102 are disposed at two ends of the alternating-current winding 101, and two ends of the first magnetic yoke 103 are connected to the direct-current windings 102 at the two ends of the alternating current 101 respectively, such that a magnetic circuit is formed when a flux pump operates; and the air gap 400 for receiving the stator unit 300 is located between the alternating-current winding 101 and the first magnetic yoke 103.

The direct-current windings 102 are disposed at the two ends of the alternating-current winding 101; one end of the first magnetic yoke 103 is connected to the direct-current winding 102 at one end of the alternating-current winding 101, and the other end of the first magnetic yoke 103 is connected to the direct-current winding 102 located at the other end of the alternating-current winding 101, such that a magnetic circuit is formed when the flux pump operates; and the air gap 400 for receiving the stator unit 300 is located between the alternating-current winding 101 and the first magnetic yoke 103.

In some other embodiments, the stator unit 300 received in the air gap 400 may be located between the alternating-current winding 101 and the first magnetic yoke 103 and close to the first magnetic yoke 103 or the alternating-current winding 101.

It should be noted that the alternating-current winding 101 is provided with a socket 1011 for winding an alternating-current wire, so the air gap 400 for receiving the stator unit 300 is located between the socket 1011 and the first magnetic yoke 103.

Figure 13:
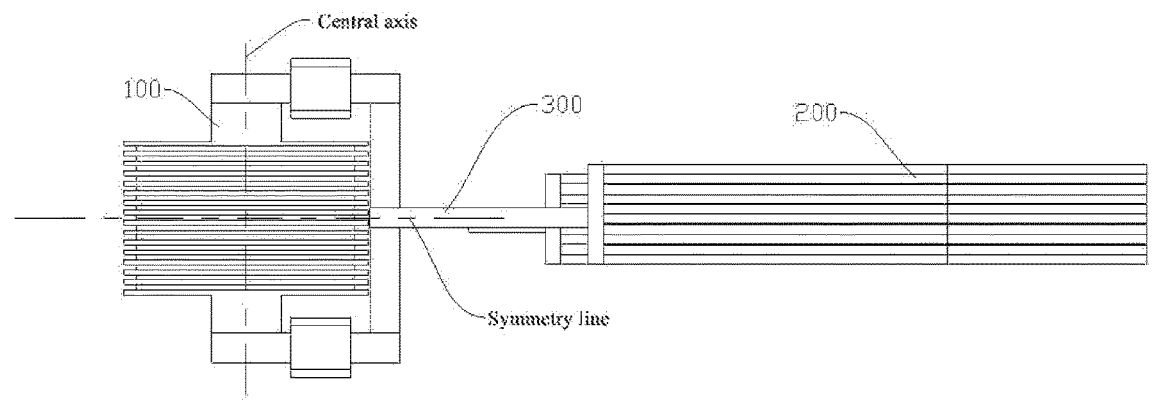
FIG. 13 is another schematic diagram of the unilateral excitation system according to one embodiment of the invention.

As shown in FIG. 13, it should be noted that, in this embodiment, the two ends of the alternating-current winding 101 are defined by a symmetry line of the alternating-current winding 101, and specifically, the symmetry line is a central axis perpendicular to the alternating-current winding 101. It can be understood that the symmetry line is parallel to the extension direction of a projection of the socket 1011 on the horizontal plane. This is the same for the following embodiments and will not be detailed anymore.

It should also be noted that, in this embodiment, the number of the direct-current windings at one end of the alternating-current winding is the same as the number of the direct-current windings at the other end of the alternating-current winding to satisfy the requirement for symmetric application of magnetic fields.

Figure 24:
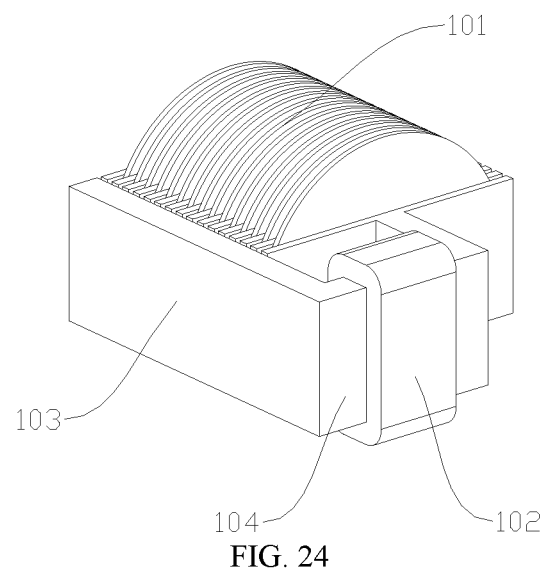
FIG. 24 is a fourth schematic diagram of the unilateral excitation system according to one embodiment of the invention.
Figure 25:
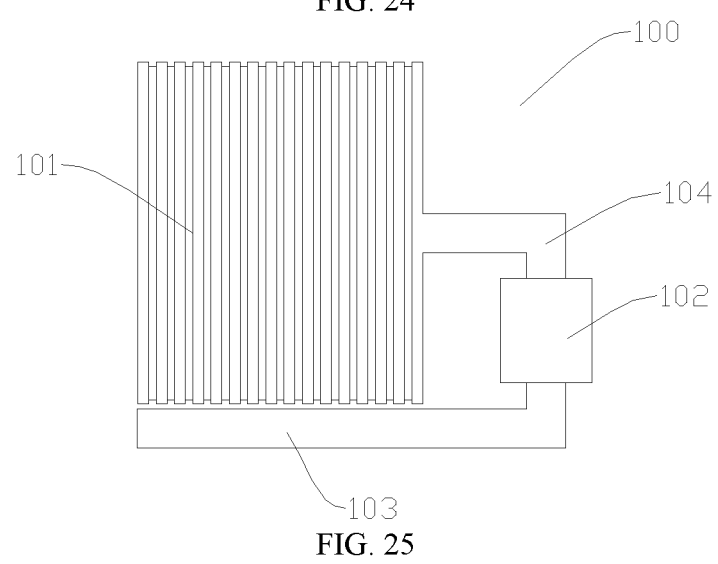
FIG. 25 is a top view of FIG. 24.

In addition, as shown in FIG. 24 and FIG. 25, the high-temperature superconducting flux pump system in other embodiments has different structural features from the high-temperature superconducting flux pump system in the above embodiment. In the above embodiment, the high-temperature superconducting flux pump system comprises two direct-current windings 102 which are located at the two ends of the alternating-current winding 101 respectively. In other embodiments, the high-temperature superconducting flux pump system may comprise one direct-current winding 102 located at one end of the alternating-current winding 101, and in this case, one end of the first magnetic yoke 103 is connected to the direct-current winding 102, and the other end of the magnetic yoke 103 extends to the other end, away from the direct-current winding 102, of the alternating-current winding 101.

Figure 11:
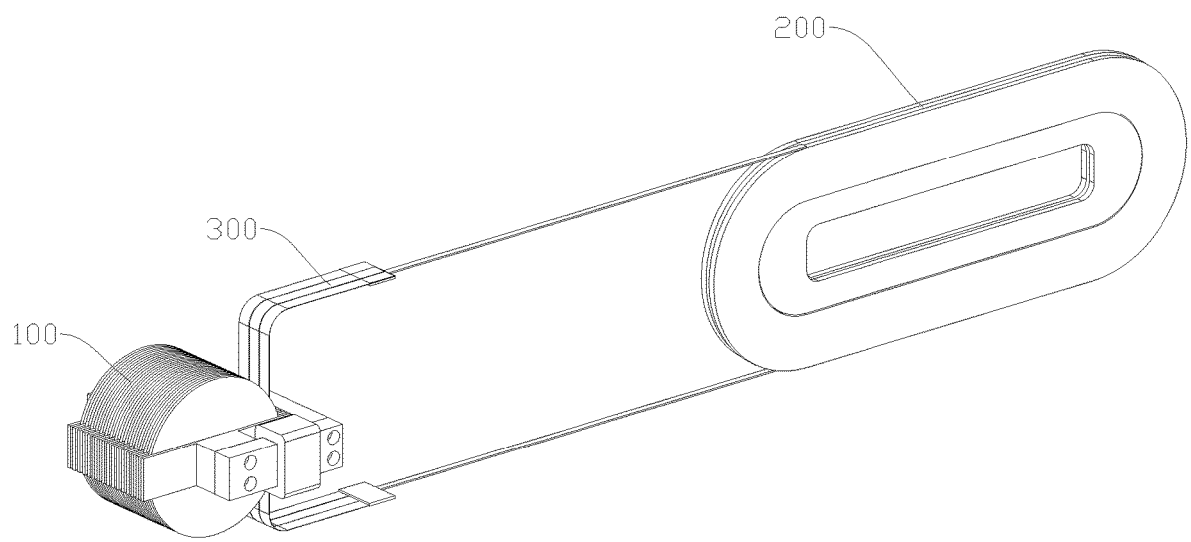
FIG. 11 is another schematic diagram of the unilateral excitation system according to one embodiment of the invention.
Figure 12:
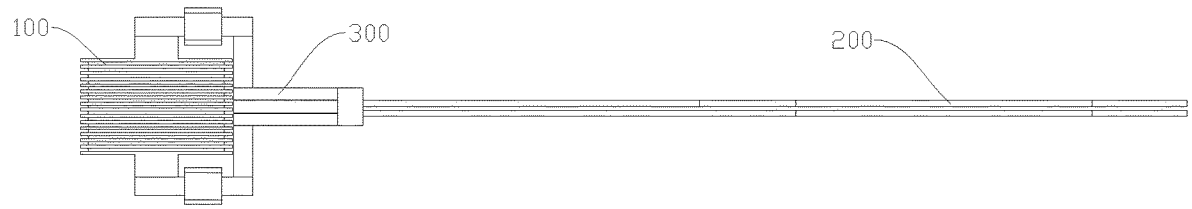
FIG. 12 is a top view of FIG. 11.

As shown in FIG. 11 and FIG. 12, to facilitate the use of this embodiment, the superconducting load 200 has an inlet terminal and an outlet terminal, and two ends of the stator unit 300 are connected to the inlet terminal and the outlet terminal respectively to form a closed circuit.

In this embodiment, the superconducting load 200 is an individual load 201 or is formed by multiple individual loads 201, and no matter whether the superconducting load 200 is an individual load 201 or is formed by multiple individual loads 201, the superconducting load 200 has one inlet terminal and one outlet terminal, which are connected to the two ends of the stator unit 300 respectively to form a complete closed circuit.

In this embodiment, multiple individual loads 201 of the superconducting load 200 are in seamless contact with each other, or are spaced from each other by a certain distance.

As shown in FIG. 13, to facilitate the use of this embodiment, the superconducting load 200 comprises at least two individual loads 201 which are arranged in parallel, each of the two individual loads 201 has an inlet terminal and an outlet terminal, which are connected to the stator unit 300 respectively to form a closed circuit.

In this embodiment, the superconducting load 200 comprises multiple individual loads 201. Different from the above embodiment where the individual loads 201 are integrated to ensure that the superconducting load 200 formed by the multiple individual loads 201 has one inlet terminal and one outlet terminal, each individual load 201 has an inlet terminal and an outlet terminal in this embodiment. Generally speaking, in this embodiment, the number of stators 301 in the stator unit 300 is the same as the number of the individual loads 201; otherwise, the specific structure of this embodiment will be the same as that of above embodiment where the multiple individual loads 201 are integrated to ensure that the superconducting load 200 has one inlet terminal and one outlet terminal. On this basis, each stator 301 has two connecting terminals, which are connected to the inlet terminal and the outlet terminal of the corresponding individual load 201 respectively.

When the stator unit 300 comprises multiple stators 301, the superconducting load 200 comprises multiple individual loads 201 and the number of the stators 301 is different from the number of the individual loads 201, the connection method in the above embodiment can still be used for connection. In this embodiment, every two adjacent stators 301 is spaced from each other by a proper distance, and such a design can also be used in the following embodiments.

The high-temperature superconducting flux pump system in all the above embodiments is a unilateral excitation system, that is, excitation is realized at only one end of the flux pump body 100. In the unilateral excitation system, each direct-current winding 102 comprises one direct-current coil. It should be noted that, in addition to the direct-current coil, each direct-current winding 102 also comprises a second magnetic yoke 104 connected to the first magnetic yoke 103. Therefore, it can be understood that in the direct-current winding 102, one end of the second magnetic yoke 104 is connected to the alternating-current winding 101, the other end of the second magnetic yoke 104 is connected to the first magnetic yoke 103, and the direct-current coil is wound on the second magnetic yoke 104. This design is also used in the following embodiments, and will not be detailed anymore.

It should be noted that, in some other embodiments, the second magnetic yoke 104 in the unilateral excitation system is connected to the alternating-current winding 101 to form a closed circuit, and in this case, the direct-current coil of the direct-current winding 102 may be wound on the first magnetic yoke 103 rather than the second magnetic yoke 104. Such a winding method can also be applied to the following embodiments, and will not be detailed anymore.

Figure 14:
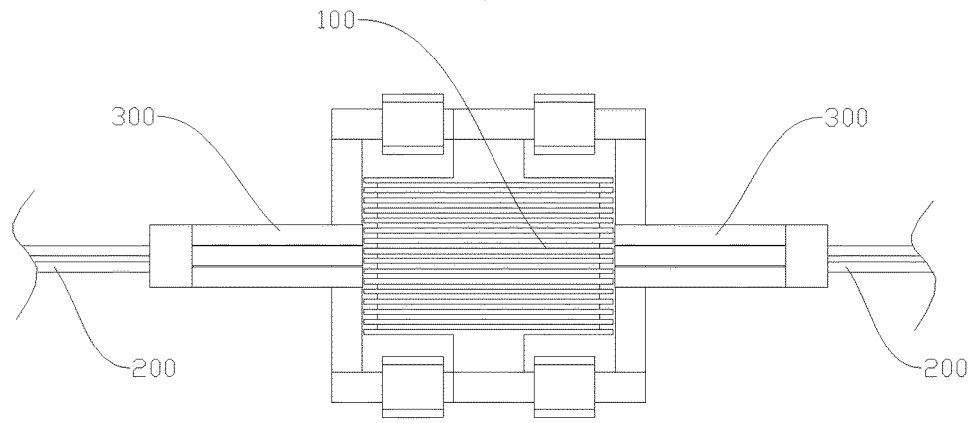
FIG. 14 is one schematic diagram of the unilateral excitation system comprising two superconducting loads according to one embodiment of the invention.
Figure 15:
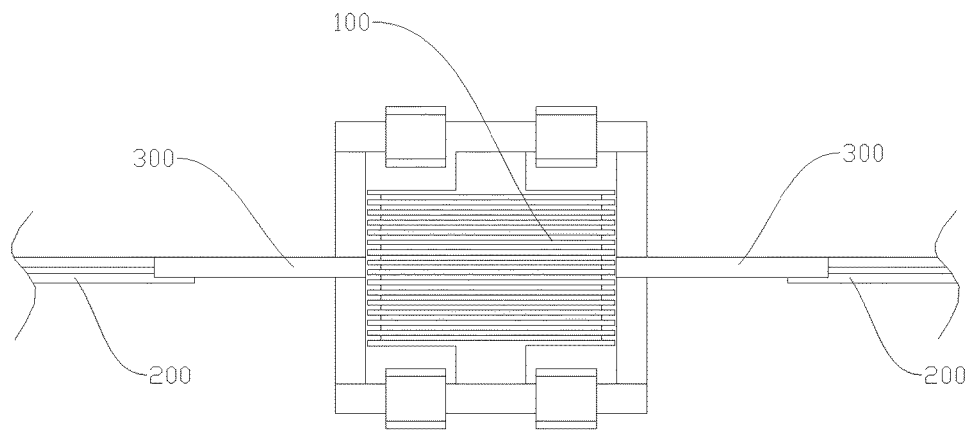
FIG. 15 is another schematic diagram of the unilateral excitation system comprising two superconducting loads according to one embodiment of the invention.
Figure 16:
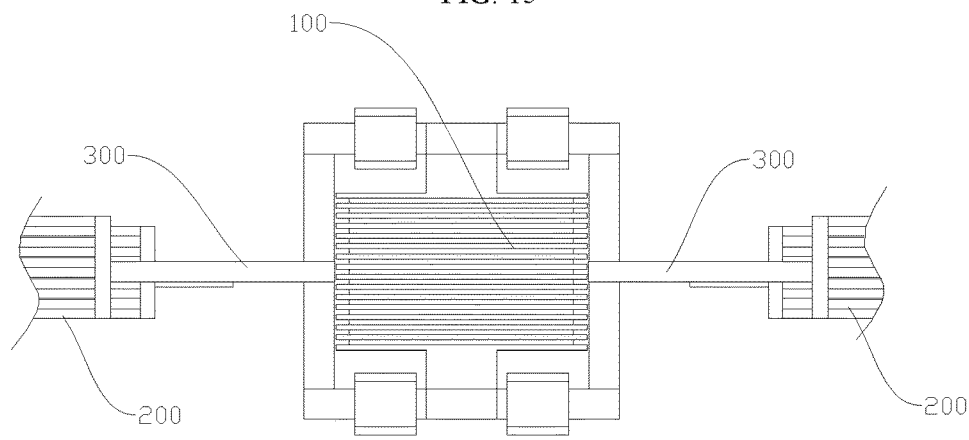
FIG. 16 is another schematic diagram of the unilateral excitation system comprising two superconducting loads according to one embodiment of the invention.

Based on any one of the above embodiments, excitation may be realized at both ends of the flux pump system, as shown in FIG. 14-FIG. 16, the flux pump system comprises two first magnetic yokes 103, which are located at two ends of the alternating-current winding 101 in a length direction and connected to the direct-current windings 102 at the two ends of the alternating-current winding 101 respectively, such that two magnetic circuits are formed when the flux pump operates; and the flux pump system comprises two superconducting loads 200 which are located at the two ends of the alternating-current winding 101 in the length direction respectively, and each superconducting load 200 is connected to the stator unit 300 at the same end, such that two closed circuits are formed.

It should be noted that, in any one embodiment, the first magnetic yoke 103 and/or the second magnetic yoke 104 may be made from iron, magnetically conductive metal such as cobalt or nickel, or magnetically conductive alloy. In this embodiment, the first magnetic yoke 103 and/or the second magnetic yoke 104 are/is made from iron.

In this embodiment, each direct-current winding 102 comprises two direct-current coils which are distributed at two ends of the direct-current winding 102 respectively, and in this case, the flux pump system is also a unilateral excitation system.

In this embodiment, each of the two ends of the flux pump body 100 is provided with one superconducting load 200 to realize excitation charging, such that the charging efficiency can be improved stably.

In addition, the unilateral excitation system is not a technical solution obtained simply by combining existing techniques. The inventor finds in actual study that the improvement of the charging efficiency of the excitation system is realized not merely by increasing or decreasing the number of the stators 301 and/or the number of the individual loads 201, and different combinations of the stators 301 and/or the individual loads 201 will also bring a different charging effect, and can remarkably improves the charging efficiency based on the prior art, without changing the magnet structure and winding cost. This is the same for a bilateral excitation system in the following embodiments.

To facilitate the use of this embodiment, a bilateral excitation system is provided on the basis of the unilateral excitation system.

That is, the flux pump system comprises two first magnetic yokes 103, which are located at the two ends of the alternating-current winding 101 in the length direction respectively and connected to the direct-current windings 102 at the two ends of the alternating-current winding 101 respectively, such that two magnetic circuits are formed when the flux pump operates; wherein, the flux pump system comprises two stator units 300, which are located in different air gaps 400, and the two stator units 300 are connected in parallel and then connected to the superconducting load 200 to form a closed circuit.

In this embodiment, each direct-current winding 102 comprises two direct-current coils, which are distributed at two ends of the direct-current winding 102 respectively. Compared with the unilateral excitation system with two closed circuits, the bilateral excitation system has only one closed circuit, which comprises two stator units 300 connected in parallel, and a superconducting load 200 connected with the two stator units 300.

Figure 26:
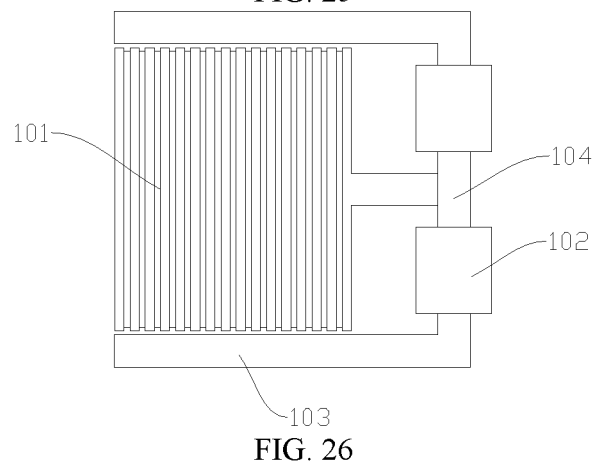
FIG. 26 is a fourth schematic diagram of the bilateral excitation system according to one embodiment of the invention.

As shown in FIG. 26, in the unilateral excitation system, when the direct-current winding 102 is disposed at one end of the alternating-current winding 101, one end of the first magnetic yoke 103 is connected to the direct-current winding 102, and the other end of the first magnetic yoke 103 extends to the other end, away from the direct-current winding 102, of the alternating-current winding 101; and this is also suitable for the above bilateral excitation system, and will not be detailed here.

Figure 17:
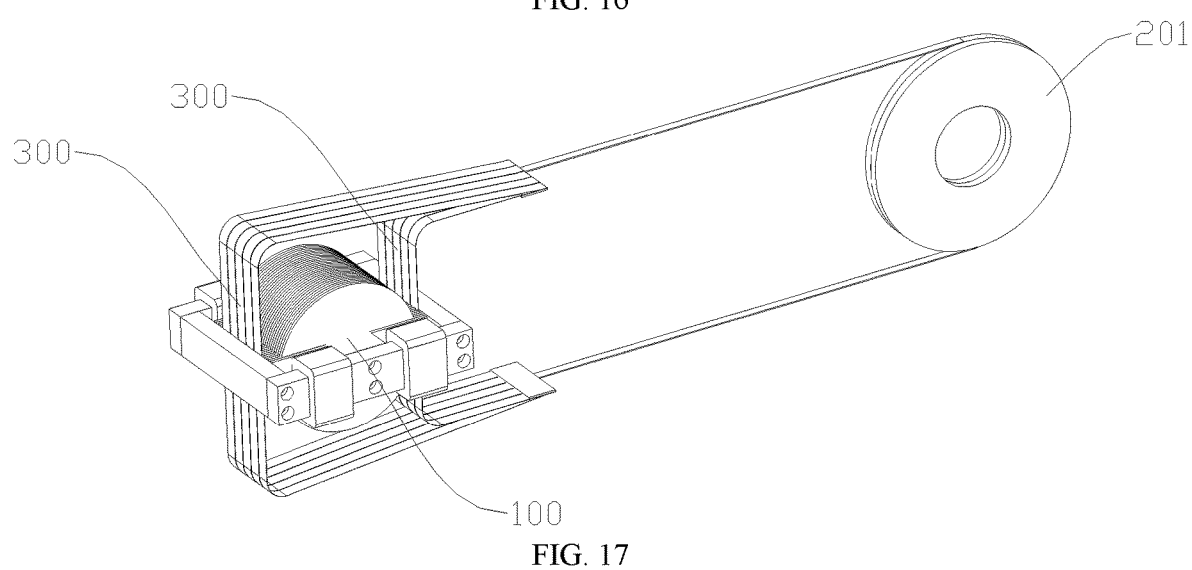
FIG. 17 is one schematic diagram of a bilateral excitation system according to one embodiment of the invention.

As shown in FIG. 17, to facilitate the use of this embodiment, the two stator units 300 connected in parallel have two connecting terminals, and the inlet terminal and the outlet terminal are connected to the two connecting terminals respectively.

In this embodiment, the two stator units 300 connected in parallel have only two connecting terminals; the inlet terminal and the outlet terminal are the inlet terminal and the outlet terminal of the superconducting load 200, or the inlet terminal and the outlet terminal of multiple individual loads 201.

Figure 18:
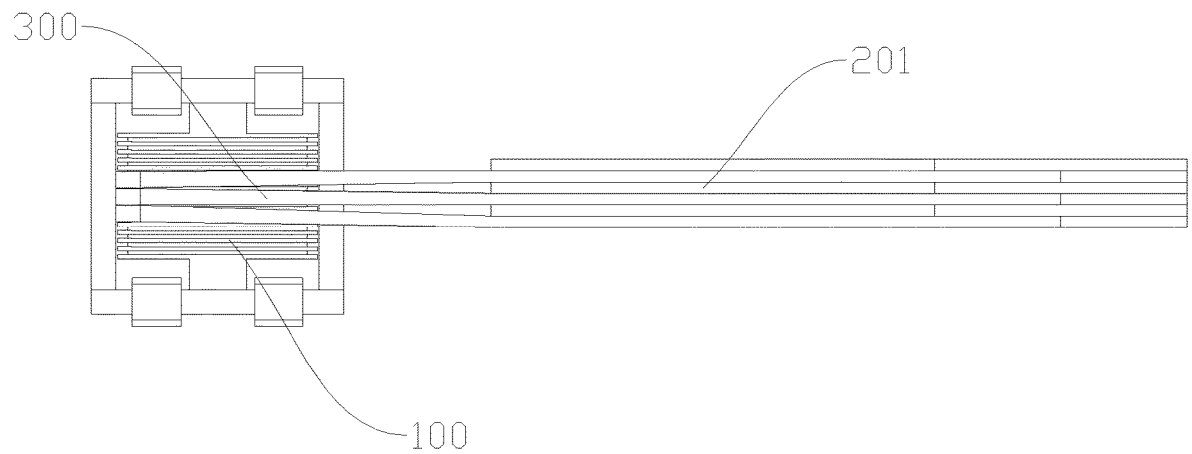
FIG. 18 is another schematic diagram of the bilateral excitation system according to one embodiment of the invention.

As shown in FIG. 18, to facilitate the use of this embodiment, each stator unit 300 comprises at least two stators 301, and all the stators 301 in each stator unit 300 are arranged in parallel; the two stator units 300 connected in parallel have at an even number of connecting terminals, which is at least two; and each connecting terminal comprises two parts, wherein one part is connected to the inlet terminal, and the other part is connected to the outlet terminal.

Because the stator 301 can be connected to the superconducting load 200 to form a closed circuit only when the stator 301 has two connecting terminals, any one stator unit 300 or stator 301 should have an even number of connecting terminals.

In this embodiment, the stator unit 300 comprises a plurality of stators 301, wherein half of the stators 301 are integrated and the other half of the stators 301 are integrated to realize connection for forming a closed circuit.

Meanwhile, when the stator unit 300 comprises only one stator 301 and the superconducting load 200 comprises multiple individual loads 201, the connection method in this embodiment can also be used. That is, the inlet terminals of all the individual loads 201 are integrated into one inlet terminal, and the outlet terminals of all the individual loads 201 are integrated into one outlet terminal, and then the inlet terminal and the outlet terminal are connected to the two connecting terminals of the stator 301 respectively.

When the stator unit 300 comprises multiple stators 301, the superconducting load 200 comprises multiple individual loads 201 and the number of the stators 301 is different from the number of the individual loads 201, the connection method in the above embodiment can also be used.

Figure 19:
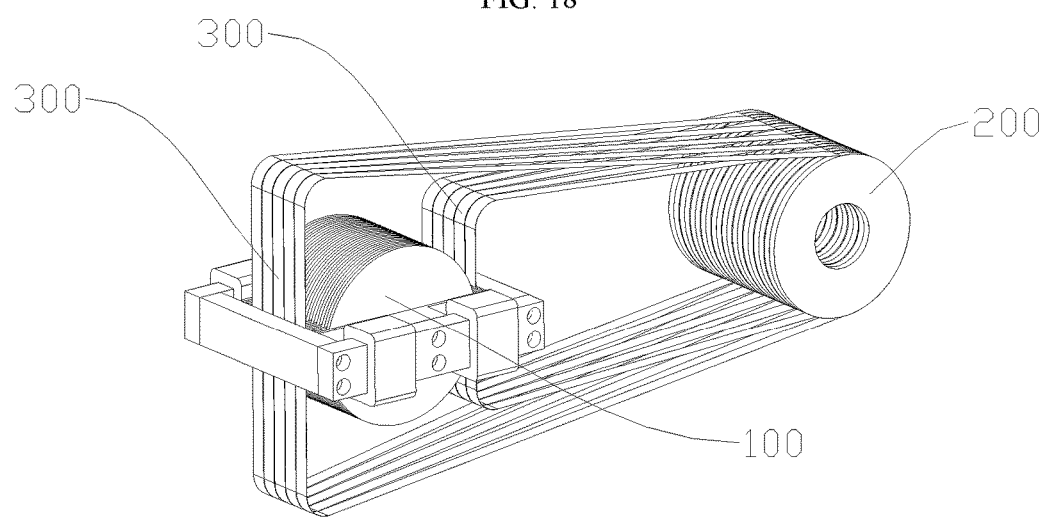
FIG. 19 is a schematic diagram of the bilateral excitation system comprising an even number of superconducting loads according to one embodiment of the invention.
Figure 20:
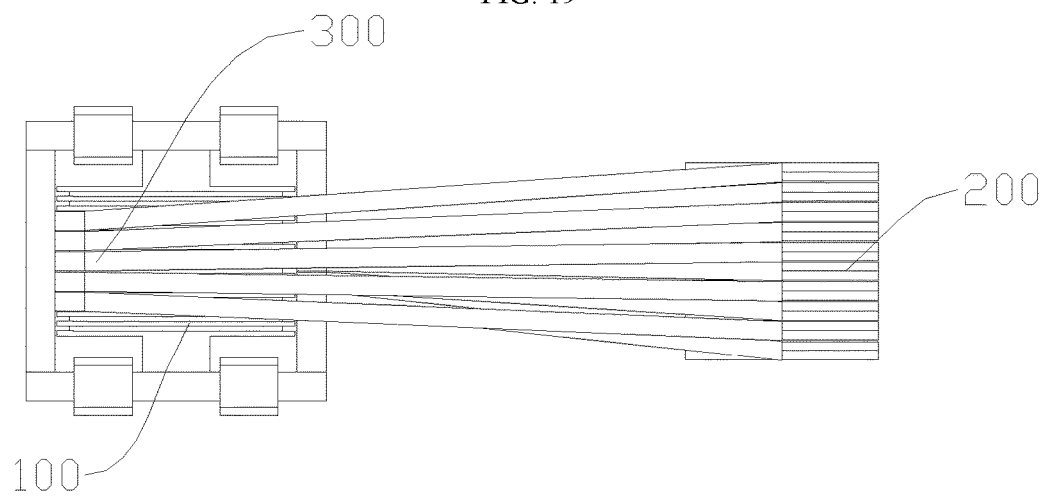
FIG. 20 is a top view of FIG. 19.
Figure 21:
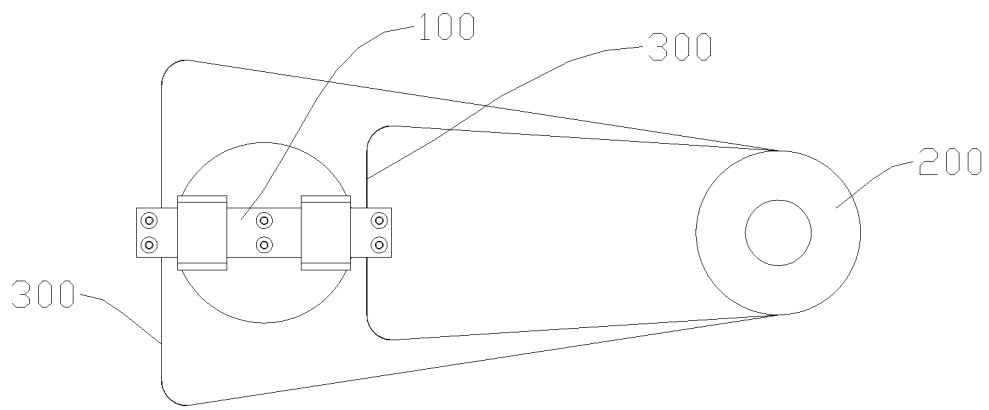
FIG. 21 is a front view of FIG. 19.

As shown in FIG. 19-FIG. 21, to facilitate the use of this embodiment, the superconducting load 200 comprises N individual loads 201, wherein N≥2, and N is an even number; the flux pump system comprises two stator units 300, and each of the two stator units 300 comprises N/2 stators 301; in the superconducting load 200, N/2 individual loads 201 are in one-to-one correspondence with the stators 301 in one stator unit 300 and are connected to the stators 301 to form a closed circuit, and the other N/2 individual loads 201 are in one-to-one correspondence with the stators 301 in the other stator unit 300 and are connected to the stators 301 to form a closed circuit.

For example, in this embodiment, N is 10, that is, the superconducting load 200 comprises 10 individual loads 201, and each stator unit 300 comprises 5 stators 301, and in this case, each individual load 201 has an inlet terminal and an outlet terminal, and each stator 301 has a connecting terminal; and the inlet terminals and outlet terminals of 5 individual loads 201 are connected to the connecting terminals of the 5 stators in one stator unit 300, and the inlet terminals and outlet terminals of the other 5 individual loads 201 are connected to the connecting terminals of the 5 stators 301 in the other stator unit 300 respectively.

So, when N is an even number such as 2, 4, . . . , 12, 14, . . . , the connection method in the above embodiment can also be used.

Figure 22:
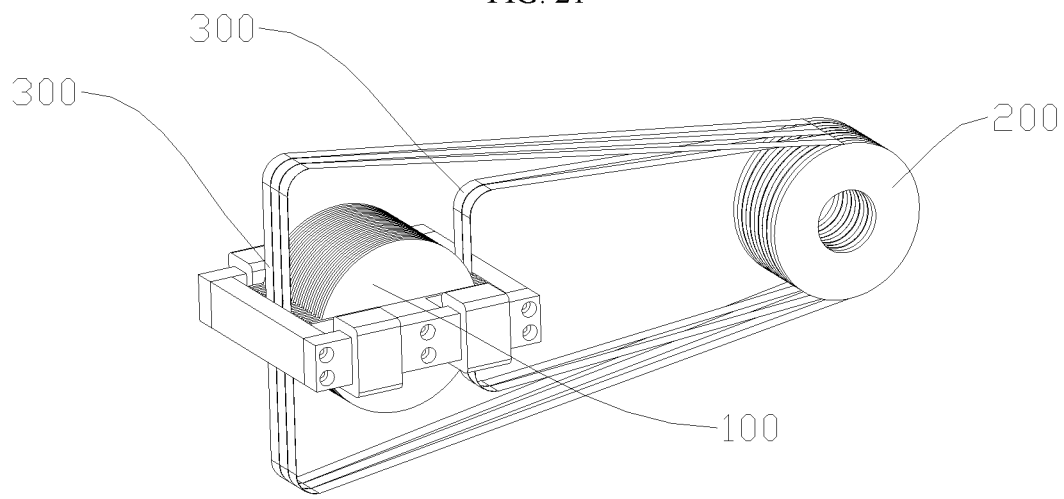
FIG. 22 is a schematic diagram of the bilateral excitation system comprising an odd number of superconducting loads according to one embodiment of the invention.
Figure 23:
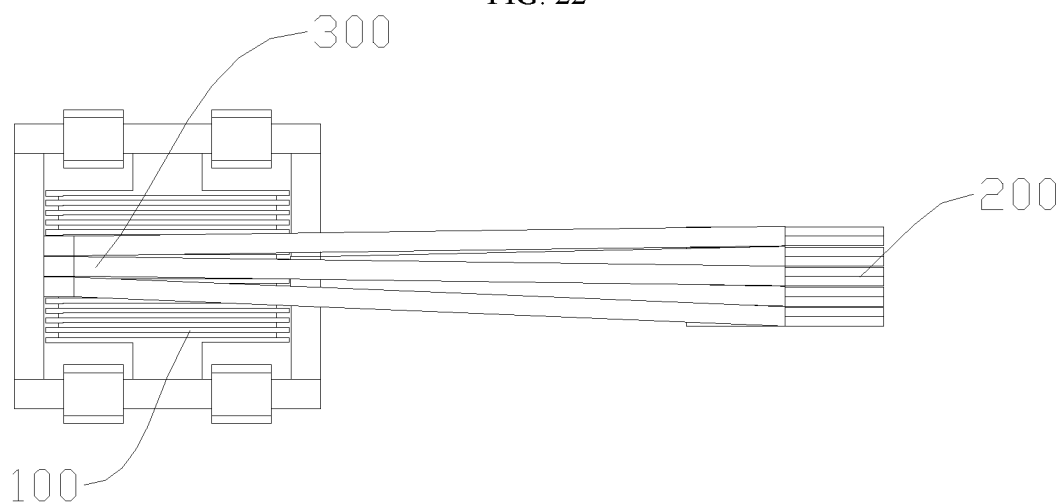
FIG. 23 is a top view of FIG. 22.

As shown in FIG. 22 and FIG. 23, to facilitate this embodiment, the superconducting load 200 comprises M individual loads 201, wherein M≥3, and M is an odd number; the flux pump system comprises two stator units 300, wherein one of the two stator units 300 comprises (M−1)/2 stators 301, and the other stator unit 300 comprises (M+1)/2 stators 301; in the superconducting load 200, (M−1)/2 individual loads 201 are in one-to-one correspondence with the stators 301 in one stator unit 300 and are connected to the stators 301 to form a closed circuit; and the other (M−1)/2 individual loads 201 are in one-to-one correspondence with the stators 301 in the other stator unit 300 and are connected to the stators 301 to form a closed circuit.

For example, in this embodiment, M is 5, that is, the superconducting load 200 comprises 5 individual loads 201, one stator unit 300 comprises 2 stators 301, and the other stator unit 300 comprises 3 stators 301, and in this case, each individual load 201 has an inlet terminal and an outlet terminal, each stator 301 has a connecting terminal, the inlet terminals and outlet terminals of 2 individual loads 201 are connected to the two stators 301 comprising two stators 301 respectively, and the inlet terminals and outlet terminals of the other 3 individual loads 201 are connected to the three stators 301 in the stator unit 300 comprising three stators 301 respectively.

So, when M is an odd number such as 3, 5, 7, 9, . . . , the connection method in the above embodiment can also be used.

Figure 27:
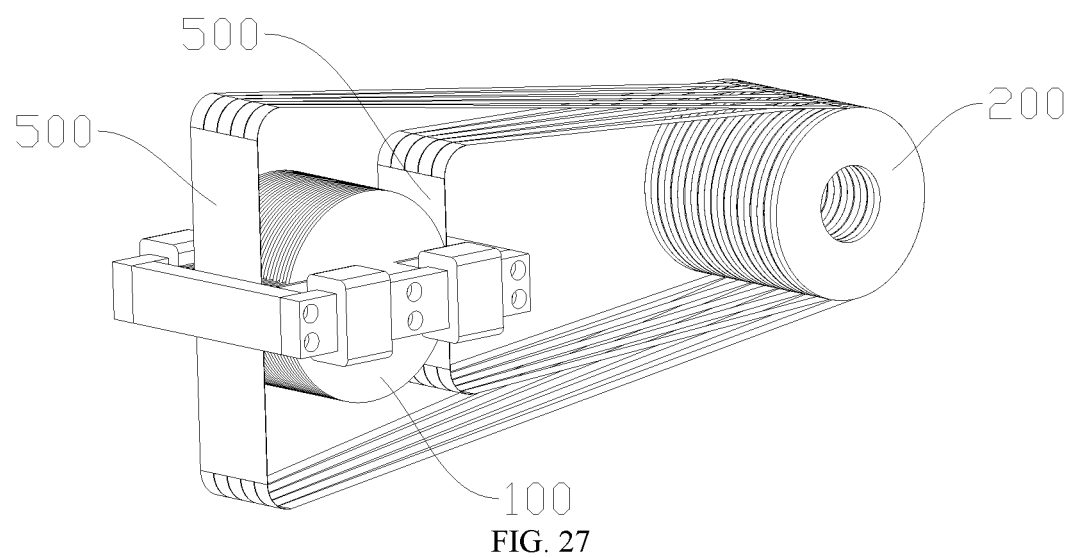
FIG. 27 is a schematic diagram of the system using a wide stator according to one embodiment of the invention.

As shown in FIG. 27, for any one of the abovementioned, the stator unit 300 can be replaced with a wide stator 500, and one wide stator 500 can supply power to at least one superconducting load, that is to say, in embodiments where a wide stator 500 is used, the flux pump system may comprise one, two, three or more superconducting loads.

The above embodiments are merely preferred ones of the invention, and it should be pointed out that the above preferred embodiments should not be construed as limitations of the invention and the protection scope of the invention should be defined by the claims. Those ordinarily skilled in the art can make some improvements and modifications without departing from the spirit and scope of the invention, and all these improvements and modifications should also fall within the protection scope of the invention.

What is claimed is:

1. A high-temperature superconducting flux pump system, comprising:
 a flux pump body;
 a superconducting load; and
 a stator unit comprising at least one stator;
 wherein, the flux pump body has an air gap for receiving the stator unit, and the superconducting load and the stator unit are connected to form a closed circuit;
 when the superconducting load comprises N individual loads (N≥2, and N is an even number) and the high-temperature superconducting flux pump system comprises two stator unit, each of the two stator unit comprises N/2 stators, wherein N/2 individual loads are in one-to-one correspondence with the stators in one stator unit and are connected to the stators to form a closed circuit, and the other N/2 individual loads are in one-to-one correspondence with the stators in the other stator unit and are connected to the stators to form a closed circuit;
 when the superconducting load comprises M individual loads (M≥3, and M is an odd number) and the high-temperature superconducting flux pump system comprises two stator unit, one of the two stator unit comprises (M−1)/2 stators, the other stator unit comprises (M+1)/2 stators, (M−1)/2 individual loads of the superconducting load are in one-to-one correspondence with the stators in one stator unit and are connected to the stators to form a closed circuit, and the other (M+1)/2 individual loads of the superconducting load are in one-to-one correspondence with the stators in the other stator unit and are connected to the stators to form a closed circuit;
 the flux pump body comprises:
 an alternating-current winding;
 a direct-current winding disposed at one end of the alternating-current winding; and
 a first magnetic yoke;
 wherein, the magnetic yoke has an end connected to the direct-current winding, as well as an end extending to the other end, away from the direct-current winding, of the alternating-current winding; and
 the air gap for receiving the stator unit is located between the alternating-current winding and the first magnetic yoke.

2. The high-temperature superconducting flux pump system according to claim 1, wherein the flux pump body comprises two first magnetic yokes which are located at two ends of the alternating-current winding in a length direction respectively;
 the high-temperature superconducting flux pump system further comprises two superconducting loads which are located at the two ends of the alternating-current winding in a length direction respectively, and each of the two superconducting loads is connected to the stator unit at the same end, such that two closed circuits are formed.

3. A high-temperature superconducting flux pump system, comprising:
 a flux pump body;
 a superconducting load; and
 stator unit each comprising at least one stator;
 wherein, the flux pump body has air gaps for receiving the stator unit, the superconducting load has an inlet terminal and an outlet terminal, and the inlet terminal and the outlet terminal are connected to the stator unit to form a closed circuit;
 when the superconducting load comprises N individual loads (N≥2, and N is an even number) and the high-temperature superconducting flux pump system comprises two stator unit, each of the two stator unit comprises N/2 stators, wherein N/2 individual loads are in one-to-one correspondence with the stators in one stator unit and are connected to the stators to form a closed circuit, and the other N/2 individual loads are in one-to-one correspondence with the stators in the other stator unit and are connected to the stators to form a closed circuit;

when the superconducting load comprises M individual loads (M≥3, and M is an odd number) and the high-temperature superconducting flux pump system comprises two stator unit, one of the two stator unit comprises (M−1)/2 stators, the other stator unit comprises (M+1)/2 stators, (M−1)/2 individual loads of the superconducting load are in one-to-one correspondence with the stators in one stator unit and are connected to the stators to form a closed circuit, and the other (M+1)/2 individual loads of the superconducting load are in one-to-one correspondence with the stators in the other stator unit and are connected to the stators to form a closed circuit;

the flux pump body comprises:

an alternating-current winding;

direct-current windings disposed at two ends of the alternating-current winding; and first magnetic yokes;

wherein, each of the magnetic yokes has an end connected to the direct-current winding located at one end of the alternating-current winding, as well as an end connected to the direct-current winding at the other end of the alternating-current winding, such that a magnetic circuit is formed when a flux pump operates; and the number of the direct-current windings at one end of the alternating-current winding is the same as the number of the direct-current windings at the other end of the alternating-current winding;

the air gaps for receiving the stator unit are located between the alternating-current winding and the first magnetic yokes;

wherein, the number of the first magnetic yokes is two, the two first magnetic yokes are located at two ends of the alternating-current winding in a length direction respectively and are connected to the direct-current windings at the two ends of the alternating-current winding respectively, such that two magnetic circuits are formed when the flux pump operates; and wherein, the number of the stator unit is two, and the two stator unit are located in different air gaps, and are connected in parallel and then connected to the superconducting load to form a closed circuit.

4. The high-temperature superconducting flux pump system according to claim 3, wherein the two stator unit connected in parallel have two connecting terminals, and the inlet terminal and the outlet terminal are connected to the two connecting terminals respectively.

5. The high-temperature superconducting flux pump system according to claim 3, wherein each said stator unit comprises at least two stators, and all the stators in each said stator unit are connected in parallel; the two stator unit connected in parallel have an even number of connecting terminals, which is at least two; each of the connecting terminals comprises two parts, wherein one part is connected to the inlet terminal and the other part is connected to the outlet terminal.

6. The high-temperature superconducting flux pump system according to claim 3, wherein the high-temperature superconducting flux pump system comprises two superconducting loads which are located at the two ends of the alternating-current winding in the length direction respectively, and each of the two superconducting loads is connected to the stator unit at the same end, such that two closed circuits are formed.

* * * * *